Figure 3:
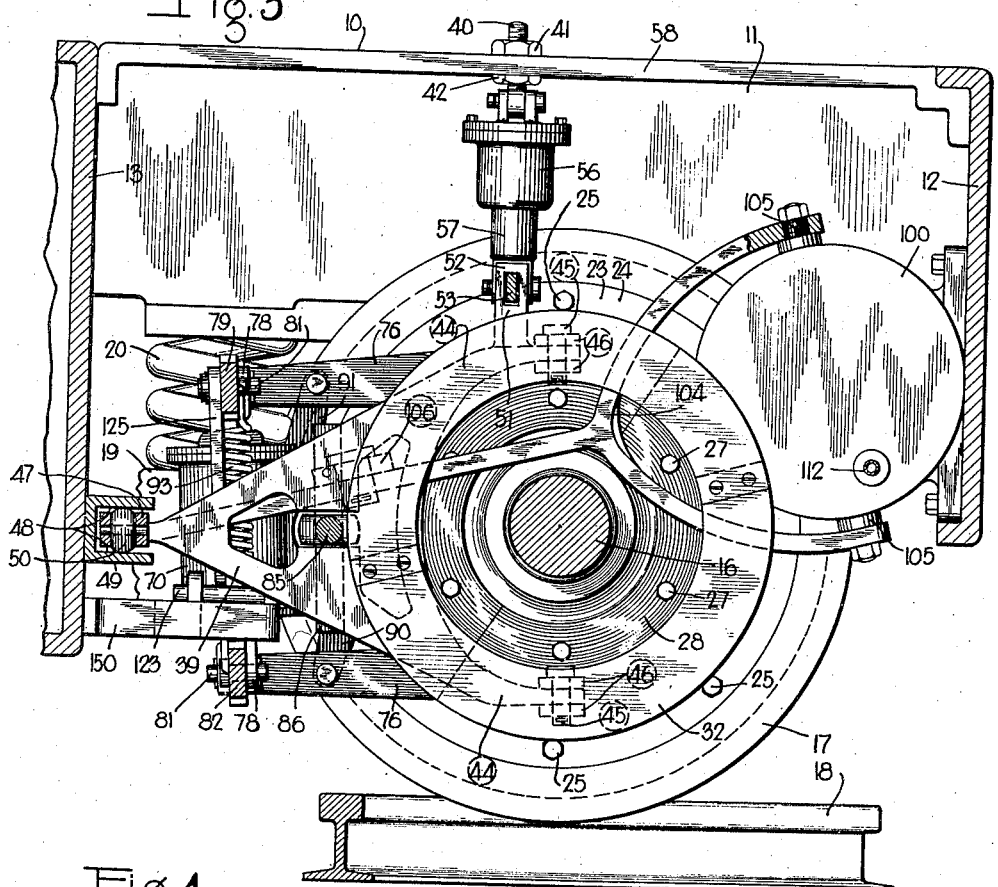

March 26, 1940.　　　C. C. FARMER　　　2,194,744
VEHICLE BRAKE SYSTEM
Filed Oct. 25, 1938　　　4 Sheets-Sheet 1
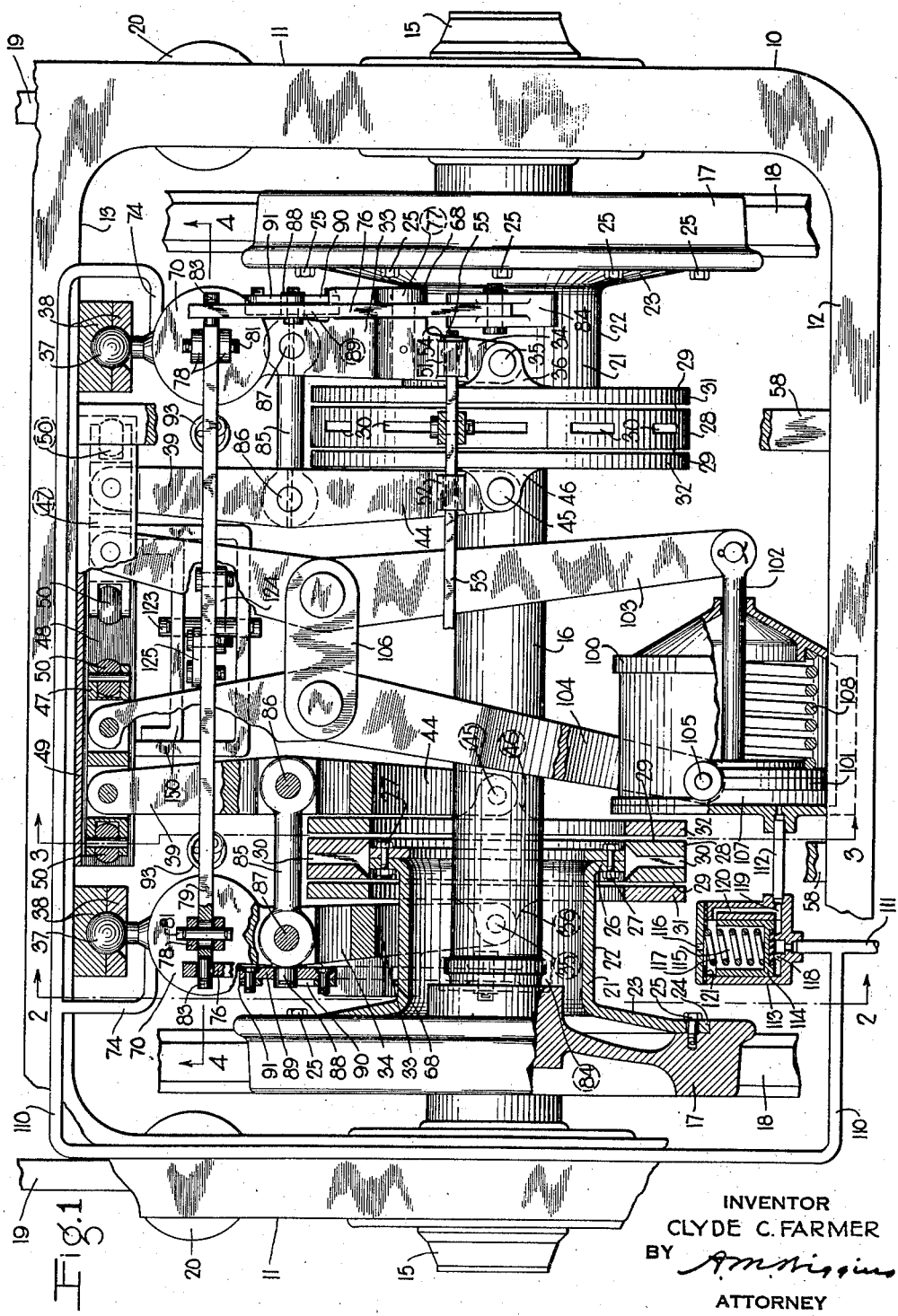
INVENTOR
CLYDE C. FARMER
BY
ATTORNEY March 26, 1940.　　　C. C. FARMER　　　2,194,744
VEHICLE BRAKE SYSTEM
Filed Oct. 25, 1938　　　4 Sheets-Sheet 2
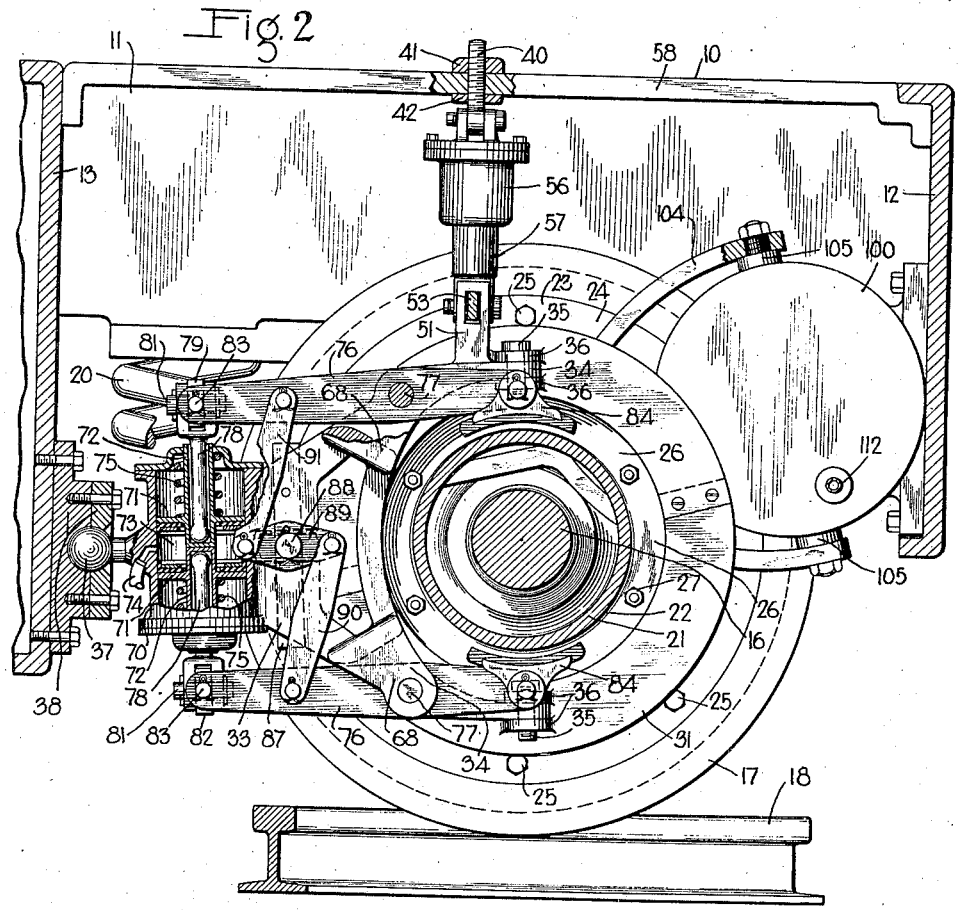
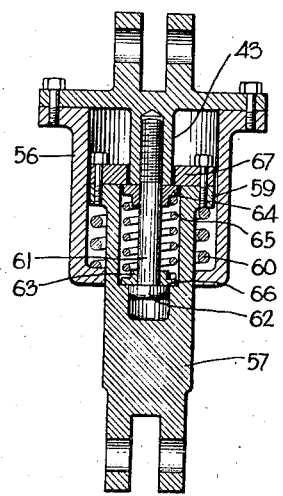
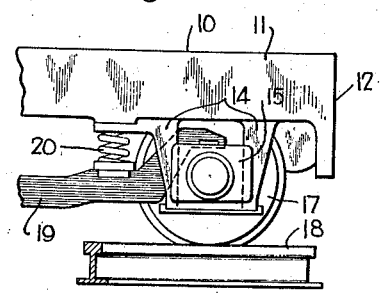
INVENTOR
CLYDE C. FARMER
BY
ATTORNEY March 26, 1940.

C. C. FARMER 2,194,744

VEHICLE BRAKE SYSTEM

Filed Oct. 25, 1938

4 Sheets-Sheet 3

INVENTOR
CLYDE C. FARMER
BY
*A. M. Higgins*
ATTORNEY

March 26, 1940.   C. C. FARMER   2,194,744
VEHICLE BRAKE SYSTEM
Filed Oct. 25, 1938   4 Sheets-Sheet 4

INVENTOR
CLYDE C. FARMER
BY
ATTORNEY

Patented Mar. 26, 1940

2,194,744

UNITED STATES PATENT OFFICE 2,194,744

VEHICLE BRAKE SYSTEM

Clyde C. Farmer, Pittsburgh, Pa., assignor to The Westinghouse Air Brake Company, Wilmerding, Pa., a corporation of Pennsylvania Application October 25, 1938, Serial No. 236,886

51 Claims. (Cl. 188—58)

This invention relates to brake mechanisms and more particularly to the friction type for use in braking the wheels of railway vehicle trucks; the present application being a continuation in part of my copending application Serial No. 198,641, filed March 29, 1938.

One object of the present invention is to provide an improved braking system for the wheels of railway vehicle trucks embodying both disc and drum type brake mechanisms arranged to cooperate to effect braking of the wheels.

Both disc and drum type brake mechanisms usually comprise rotatable friction braking elements carried by and rotatable with the wheels to be braked and non-rotatable friction braking elements adapted to be moved into fractional engagement with the rotatable elements for effecting braking thereof and of the connected wheels, and means in one form or another for controlling movement of the non-rotatable braking elements into and out of such frictional braking engagement with the rotatable braking elements.

Another object of the invention is to provide an improved braking system embodying both drum and disc type brake mechanisms, such as above described, in which the rotatable braking elements of both mechanisms are carried by the vehicle wheels, while all other parts of said mechanisms are normally carried by the vehicle truck frame as sprung weight with respect to the truck wheels in order to avoid excessive pounding of the truck wheels against rail joints or the like and consequent damage to either or both of the wheels and rails and possibly other parts of the truck.

Where certain parts of a brake mechanism are carried by a truck frame which is resiliently supported on truck wheels, said parts will move vertically with said frame and therefore assume different vertical positions with respect to said wheels, due to different degrees of load carried by the truck or due to vibration of the truck while the truck is in motion. It will therefore be evident that the non-rotatable braking elements of the improved brake system will at different times assume various positions eccentric to the rotatable braking elements carried by the truck wheels; however, at the time an application of the brakes is effected, it is desired that the non-rotatable braking elements of the brake system be in concentric relation with the rotatable braking elements for cooperation therewith.

Another object of the invention is therefore to provide means for moving the non-rotatable braking elements of my improved brake system relative to the truck frame into concentric cooperative relationship with the rotatable elements carried by the wheels at the time an application of the brakes is effected, and a still further object of the invention is to provide means for accurately defining the centralized position in which this relationship is obtained and for holding said non-rotatable braking elements in such position so long as the brakes on the truck are applied.

According to the last two objects, the parts of the brake system normally carried by the truck frame are adapted to move therewith relative to the parts carried by the truck wheels when the brakes on the truck are released. However, centralizing means are provided which are adapted to act at the time an application of the brakes on the truck is initiated to shift or rock the parts of the brake system carried by the truck frame in a substantially vertical direction relative to said frame into concentric cooperative braking relationship with the parts of the brake system carried by the truck wheels, and means are provided for defining this relationship and for securely holding the parts in such relationship while the brakes on the vehicle are applied.

The parts of the brake system normally carried by the truck frame are connected thereto for support by one or more hinge like connections at one end and by means at the opposite end adapted to permit rocking movement of said parts about the hinge connections in a substantially vertical direction relative to the truck frame into cooperative relationship with the parts of the brake system carried by the truck wheels, and another object of the invention is to provide means for breaking the connection between said opposite end of the brake system and the truck frame at the time an application of the brakes is initiated and for making such connection at the time an application of the brakes is released, whereby excessive or uneven wear of the centralizing means is avoided while the brakes on the truck are applied.

Another object of the invention is to provide an improved brake system embodying a brake mechanism the major portion of the weight of which is carried by the truck frame, and which embodies means operative at the time an application of the brakes is initiated to effect centralization of the parts of said mechanism carried by the truck frame with the parts carried by the truck wheels for braking operation, and also to effect braking of said wheels.

Another object of the invention is to provide an improved braking system embodying both disc and drum type brake mechanisms associated with a vehicle truck as above described and adapted to cooperate to effect braking of the wheels of the truck and so arranged that the parts of the drum type brake mechanism are self-centralizing and operative to centralize the parts of the disc brake mechanism at the time an application of the brakes is initiated.

Another object of the invention is to provide an improved braking system embodying both disc and drum type brake mechanisms and means automatically operative at the time an application of the brakes is effected to first effect operation of the drum brake mechanism to centralize the parts of both of said mechanisms for braking operation and to then effect operation of both of said mechanisms to effect braking of the car wheels.

A still further object of the invention is to provide an improved braking system embodying both disc and drum type brake mechanisms such as above described and independent pressure means for effecting operation of both mechanisms, and means for controlling the operation of said independent pressure means whereby the drum brake mechanism is first operative to centralize the parts of a disc brake mechanism for braking and to also initiate the application of brakes and whereby the disc brake mechanism is operative to brake the truck wheels only after centralization of the parts thereof.

Another object of the invention is to provide an improved braking system embodying independent pressure means for controlling braking operation of both disc and drum type brake mechanisms, and means for controlling the operation of said independent pressure means adapted to be controlled by a conventional type of air brake valve device provided on railway vehicles.

Another object of the invention is to provide an improved braking system embodying both disc and drum type brake mechanisms which are cooperative to effect braking of the wheels of a vehicle truck in the usual service operation and also embodying means operative by hand for effecting operation of one of said mechanisms independently of the other to brake the truck wheels for holding the truck stopped.

Another object of the invention is to provide a brake system embodying both disc and drum type brake mechanisms and cooling means adapted to dissipate heat incident to braking from the braking elements of both mechanisms in order to maintain the temperature of said elements at a sufficiently low degree to provide for efficient braking operation thereof.

Other objects and advantages will be apparent from the following more detailed description of the invention.

Description of parts

Figure 4:
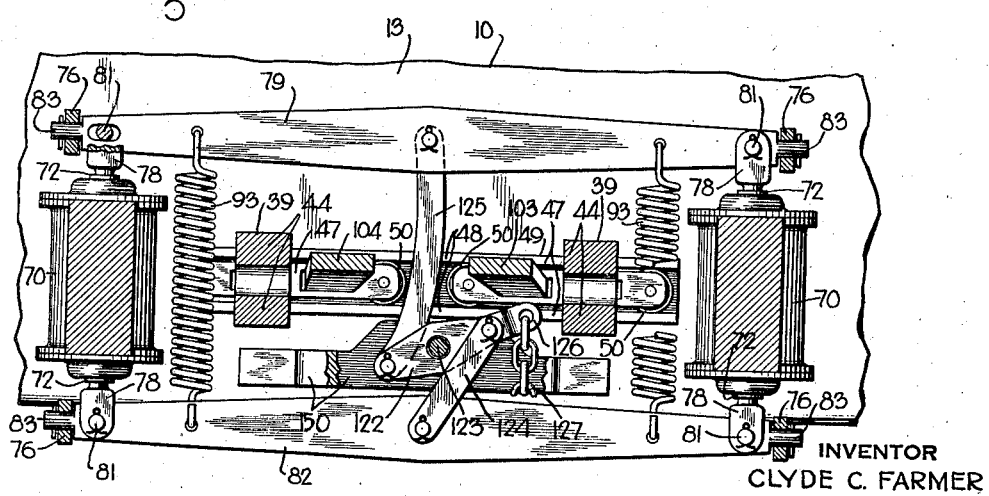
Figure 6:
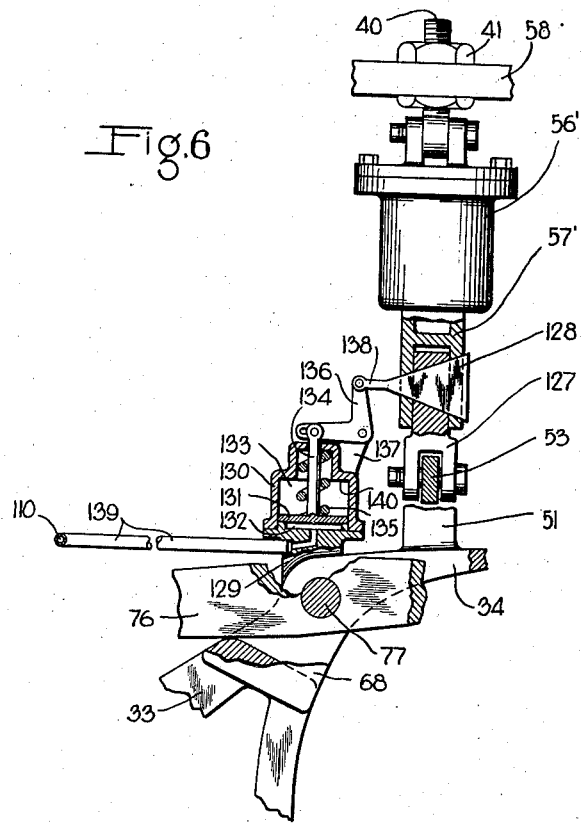
Figure 7:
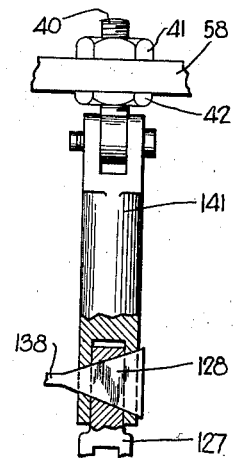

In the accompanying drawings; Fig. 1 is a plan view of a portion of a railway vehicle truck showing, partly in section and partly in plan, the invention applied thereto; Figs. 2, 3 and 4 are sectional views taken on the lines 2—2, 3—3 and 4—4 in Fig. 1; Fig. 5 is a sectional view of a spring supporting device shown in elevation in Figs. 2 and 3; Fig. 6 is a view similar to a portion of Fig. 2 but embodying a modified form of the invention; Fig. 7 is a view similar to a portion of Fig. 6 embodying another modification of the invention; and Fig. 8 is a side view of a portion of one end of a railway vehicle truck with which the improved brake mechanism is associated, for the purpose of illustration.

As shown in the drawings the vehicle truck comprises a truck frame 10 having spaced side members 11 connected together by the usual transverse end members 12 and transoms 13; only one end member and transom being shown.

The side members 11 are provided with the usual spaced pedestals 14 slidably mounted on journal boxes 15 in which the two ends of an axle 16 are journaled. A pair of wheels 17 are secured to axle 16 between the journal boxes 15 in the usual spaced relation for rolling on track rails 18.

The truck shown in the drawings is of the type having an equalizer bar 19 at each of the opposite sides, which bars are carried by the journal boxes 15 and which carry springs 20 upon which the truck frame 10 is resiliently supported.

According to the invention there is disposed, preferably adjacent the inner face of each of the wheels 17, a braking unit comprising both a disc brake mechanism and a combined centering and drum brake mechanism. Both of these braking units are of like construction but oppositely disposed.

Each of these braking units comprises a rigid sleeve 21 encircling the axle 16 and having a central, cylindrical drum portion 22 constituting a combined centering and brake drum which, as shown, is arranged concentric with the wheels 17. This drum 22 on each sleeve 21 is joined at its outer end to the smaller end of an outwardly flaring frusto-conical shaped portion 23 having its outer or larger end integrally connected to an annular end flange 24. The flange 24 on each sleeve 21 is disposed in a suitable recess provided in the inner face of the adjacent wheel 17, adjacent the tread portion thereof and is rigidly secured to said wheel by bolts 25.

Each of the sleeves 21 is provided at its inner end with an outwardly extending annular flange 26 to the outside face of which there is rigidly, and removably secured in any desired manner, as by bolts 27, an annular rotatable friction braking element or disc 28 which is preferably made in two, complementary, oppositely disposed sections arranged in substantial abutting relation to facilitate replacement.

Each of the brake discs 28 is substantially T-shaped in cross-section comprising a central bolting flange for securing to the sleeve flange 26 and encircled by a relatively thick braking portion provided with oppositely disposed braking faces 29. Each of the discs 28 is provided with a plurality of spaced, air ducts 30 extending radially through the disc between the braking faces 29 and open at their outer ends to the outer periphery of the disc. The inner ends of the ducts 30 in each disc 28 are open to both sides of the bolting flange of the disc 28, the opening at one side of said flange being to the space between the two discs 28, while the opening at the opposite side is past the flange 26 on the sleeve 21 to the space around the exterior of the drum 22.

From the above description it will be noted that both drums 22 and the braking discs 28 are rigidly secured to the truck wheels 17 in concentric relation therewith and are adapted to rotate with said wheels. It will also be noted that rotation of the discs 28 is adapted to create a flow of air through the ducts 30, a portion of said air being drawn from the space around the brake drums 22. This flow of air through the ducts 30 between the braking faces 29 of the braking discs 28 is adapted to dissipate heat from said discs incident to braking, while the flow of air through the space around the drums 22 is adapted to dissipate heat from said drums and from the braking elements adapted to frictionally engage said drums, which will be later described.

An annular non-rotatable friction braking element or disc 31 encircling the axle 16 and brake drum 22 is disposed adjacent the outer face 29 of each of the rotatable discs 28, while a like, non-rotatable friction braking element or disc 32 encircling the axle 16 is disposed adjacent the inner face 29 of each of said rotatable discs. The non-rotatable discs 31 and 32 are of substantially the same outside and inside diameter as the rotatable discs 28, the inside diameter being such however as to permit a certain movement of said non-rotatable discs relative to the axle 16 and brake drums 22 in a vertical direction, for reasons which will be apparent later.

Each of the non-rotatable discs 31 and 32 may be of any desired construction or be made of any desired material to provide friction braking faces for frictionally engaging the braking faces 29 of the rotatable braking discs 28. Preferably, each of the non-rotatable discs 30 and 31 is made in two oppositely disposed, complementary sections in order to facilitate assembly and replacement thereof around the drums 22 and axle 16; the sections of each of said discs being rigidly secured together in their working relation in any desired manner by screws as shown or by any other suitable means.

A substantially, horizontally extending Y-shaped arm or lever 33 is provided between each of the non-rotatable braking discs 31 and the adjacent wheel 17. Each of these levers is provided with two diverging arm portions 34 disposed one above the other and arranged one above and one below the adjacent drum 22 and pivotally connected at their ends by substantially vertically disposed pins 35 to diametrically opposite lugs 36 projecting from the outer face of the adjacent non-rotatable braking disc 31.

At the opposite end of each of the levers 33 there is provided a ball 37 which is supported and disposed to rock in a socket member 38 secured to any suitable portion of the truck frame 10, such as transom 13, at substantially the same elevation as axle 16.

A substantially horizontally extending Y-shaped arm or lever 39 is provided adjacent each of the inner non-rotatable braking discs 32 substantially opposite the levers 33. Each of the levers 39 is provided with two diverging arms 44 disposed one above the other and arranged one above and one below axle 16 and pivotally connected at their ends by vertically disposed pins 45 to diametrically opposite lugs 46 provided on the adjacent non-rotatable disc 32. The opposite end of each of the levers 39 is pivotally connected to one end of a link 47 which is disposed between the side-walls 48 of a channel shaped element 49 extending transversely of the truck between the socket members 38 and which is rigidly secured to the transom 13 in any desired manner.

Each of the links 47 is carried on two spaced rollers 50 arranged one at each end of each link and adapted to roll on one or the other of the side walls 48 of the channel shaped element 49, the periphery of said rollers being arcuate in shape to permit rocking of the link relative to said channel.

Each of the levers 33 is provided with a lug 51 which projects upwardly from the upper leg 34 adjacent the pivot pin 35, while each of the levers 39 is provided with a like lug 52 projecting upwardly from the upper leg 44 thereof in horizontal alignment with the lugs 51. Each of the lugs 51 and 52 is provided with a rectangular opening, and extending through these several openings in a direction transversely of the truck frame 10 in a rectangular support bar 53. A stop 54, is provided on each of the opposite ends of the bar 53 said stops being preferably in the form of washers which are held in place by cotter keys 55 or the like extending through the ends of the bar. The fit between the bar 53 and the lugs 51 and 52 is slightly loose to permit sliding of said lugs on said bar in a direction transversely of the truck frame 10 and to permit a certain angular movement of said lugs relative to said bar.

A pair of spring supporting devices 56 are provided for resiliently carrying the bar 53 and parts of the brake mechanism supported on said bar from any suitable portion of the truck frame 10, such for instance as from two rigid elements 58 extending between and secured at opposite ends to the end member 12 and transom 13.

Each of the devices 56 comprises a casing pivotally connected to one end of an adjusting screw 40 which extends through a suitable opening in one of the elements 58 and which is rigidly secured thereto by an adjusting nut 41 at one side of the element and a lock nut 42 at the opposite side. In each of the devices 56 there is provided a plunger 57 extending through the lower end of the casing, the plunger 57 in one of the devices being pivotally connected at its outer end to bar 53 between the lugs 51 and 52 at one side of the truck, while the plunger 57 in the other device is pivotally connected to bar 53 between lugs 51 and 52 at the opposite side of the truck.

In each of the devices 56 the plunger 57 is provided with an enlarged head portion 59 between which and the lower end of the casing is interposed a spring 60 adapted to urge the plunger 57 in an upwardly direction. The combined pressures of the two springs 60 in the two devices 56 is just sufficient to counterbalance the weight of the bar 53, the non-rotatable discs 31 and 32 suspended on said bar, and the adjacent portions of the brake levers 33 and 39 and other parts of the brake mechanisms to be later described.

Each of the plungers 57 is provided with an axial bore in which there is dispose a pin 61 secured at its upper end to a boss 43 depending from the casing of the device, and having at its lower end a head 62 disposed in a counter bore provided below the bottom of said axial bore, a shoulder 66 being thereby provided at the bottom of said axial bore. A pair of spring seats 63 and 64 are slidably mounted on the pin 61 between the end of boss 43 and the pin head 62 in each of the devices 47. A spring 65, under a predetermined compression, is provided on each of the pins 61 between the spring seats 63 and 64 thereon.

The shoulder 66 in each of the plungers 57 is provided for engagement with the spring seat 63, while secured to each of the plunger heads 59 is a ring 67 which forms a shoulder for engagement with the spring seat 64.

The parts of the devices 56 normally occupy the position in which they are shown in Fig. 5 of the drawings. In this position it will be noted that the spring 65 in each of the devices 56 is rendered inactive due to confinement between the spring seats 63 and 64 which are in engagement respectively with the pin head 62 and boss 43. Under this condition the springs 60 alone are effective and act to counterbalance the weight of the bar 53, the non-rotatable discs 31 and 32, the connected ends of the levers 33 and 39 and other adjacent parts of the brake mechanisms to be later described.

If, due to irregularities in the track rails 18 or for any other reason, the parts of the brake mechanism carried by the devices 56 tend to move upwardly relatively to the truck frame, such movement of the plungers 57 within said devices acts through the shoulders 66 to move the spring seats 63 against the opposing pressures of springs 65. In case however the parts of the brake mechanism tend to move downwardly relative to the truck frame, such movement of plungers 57 acts through the rings 67 to move spring seats 64 against the opposing pressures of springs 65. In either case, the springs 65 act to oppose movement of the plungers 57 and the parts of the brake mechanism carried by said plungers in either direction from their normal supported position shown in the drawings, and the pressure of said springs is such as to immediately dampen such movement and return the parts to their normal position. More specifically, the springs 65 and the parts of the devices 56 which control their operation are provided to dampen oscillation of the non-rotatable discs 31 and 32 relative to the truck frame 10 due to irregularities in the track rails or the like.

It will be evident that since the non-rotatable discs 31 and 32 and the connected ends of the brake levers 33 and 39 are supported from the truck frame by the ball and socket connections 37, 38 at one end and by the devices 56 at the opposite end, said discs are adapted to move vertically with the truck frame relative to the wheels 17, and will therefore assume various positions eccentric to the rotatable braking drums 22 and discs 28, dependent upon various degrees of load carried by the truck or the like.

In the drawings the non-rotatable braking discs 31 and 32 are shown in concentric relation with the rotatable braking discs 28. This relationship is, however, obtained only when the vehicle supported on the truck frame 10 is carrying a substantially half load. When the vehicle carried by the truck frame is empty, said frame and thereby the non-rotatable braking discs 31 and 32 are adapted to be elevated by springs 20 to a position above that shown and in which said braking discs are in eccentric relation to the rotatable braking discs 28, while when the vehicle supported by the truck frame is fully loaded, said frame and thereby said non-rotatable braking discs will assume a position below that shown and in eccentric relationship to said rotatable braking discs. In other words, the non-rotatable braking discs 31 and 32 will assume various positions above and below that shown in the drawings and eccentric to the rotatable discs 28, depending upon the vertical position of the truck frame with respect to the truck wheels 18 as governed, for instance, by the degree of load carried by the vehicle supported on the truck.

At the time the non-rotatable braking discs 31 and 32 are moved into frictional braking engagement with the rotatable braking discs 28 for effecting braking thereof and of the wheels 17, as will be later described, it is desired that said non-rotatable discs be in concentric relationship with said rotatable discs. This centralizing of the non-rotatable braking discs 31 and 32 with the rotatable braking discs 28 is accomplished by the operation of a drum type of mechanism which is associated with each of the levers 33. This mechanism is primarily provided as a centering means for the non-rotatable discs 31 and 32, but as hereinafter described, it also serves as a brake mechanism.

The drum mechanism associated with each of the levers 33 comprises a substantially vertically arranged double-ended centering cylinder device 70 preferably formed integral with said lever and containing a pair of like, oppositely working pistons 71 each of which is provided with an outwardly extending hollow piston rod 72 slidably mounted in suitable bores through the top and bottom walls of the device.

A chamber 73 is formed intermediate each pair of pistons 71 and is connected to a pipe 74 through which fluid under pressure is adapted to be supplied to and released from said chamber, as will be hereinafter described. Each of the pistons 71 has at its outer face a chamber containing a release spring 75 for moving the piston toward the center of the cylinder, and said chamber is open to the atmosphere in any desired manner such as by way of clearance space provided between the hollow piston rod 72 and the end of the casing through which said rod operates.

The pair of pistons 71 in each of the cylinder devices 70 is provided for operating a pair of oppositely disposed combined centering and brake cylinder levers 76 which are pivotally mounted intermediate their ends on pins 77 secured at one side of said levers in the arm portions 34 of the adjacent lever 33 and at the opposite side in lugs 68 projecting from said arm portions.

A push rod 78 is provided in each of the hollow piston rods 72. Each of the push rods 78 is of smaller diameter intermediate its ends than the inside diameter of the hollow piston rod so as to be capable of rocking movement transversely of said rod and is provided at its inner end with an enlargement for engaging the piston 71.

An equalizer bar 79 extending in a direction transversely of the truck frame is pivotally connected at its opposite ends through the medium of pins 81 to the ends of the two push rods 78 projecting from the top of the two cylinder devices 70, while a like and parallel equalizer bar 82 is provided below said cylinder devices and is pivotally connected at its opposite ends to the lowermost push rods 78 by pins 81.

The equalizer bar 79 is provided at each of its opposite ends beyond the connection with the respective push rods 78 with an outwardly extending journal portion 83 and upon which journal portions are rockably mounted the adjacent ends of the two centering levers 76 carried in the upper arm portions 34 of levers 33. The equalizer bar 82 is likewise provided at its opposite ends with journal portions 83 upon which are rockably mounted the adjacent ends of the levers 76 carried in the lower arm portions 34 of levers 33. The opposite ends of the two levers 76 in each braking unit terminate above and below the drum 22 substantially diametrically opposite each other and each supports a combined centering and brake shoe 84 which is preferably of the conventional design employed on railway vehicles and which is arranged for frictional engagement with the exterior surface of the adjacent drum 22.

The two brake levers 33 and 39 in each braking unit are operatively connected together between their ends by a link 85 pivotally connected to the lever 39 by a pin 86 and to the lever 33 by a pin 87, which link is provided beyond the pivotal connection with pin 87 with a journal portion 88 upon which an equalizer lever 89 is journaled midway between its ends.

In each brake unit one end of the equalizer lever 89 is connected by a link 90 to the lowermost lever 76 intermediate the pivot pin 77 and the cylinder push rod 78, while the other end of said equalizer lever is pivotally connected through the medium of a link 91 to a corresponding part of the upper lever 76.

The equalizer levers 89 and links 90 and 91 connecting each pair of levers 76 together are provided so that each pair of levers 76 will move together and to the same degree and so that the shoes 84 at the end of said levers will therefore at all times occupy the same positions relative to the respective arms 34 of the disc brake levers 33.

The combined centering and drum brake cylinder pistons 71, rods 78, levers 76 and shoes 84 are shown in Fig. 2 of the drawings in the positions occupied when the brakes on the truck are released and at which time the parts of the brake mechanisms associated with and carried by the disc brake levers 33 are in their normal position supported from the truck frame 10 through the medium of the spring supporting devices 56 at one end and the ball and socket connections 37, 38 at the opposite end.

When the shoes 84 are in their release positions, just described, the two shoes carried by the disc brake levers 33 in each braking unit are spaced apart a distance slightly exceeding the diameter of the respective drum 22 plus the full vertical movement of the truck frame 10 relative to the wheels 17, and the vertical position of said shoes with respect to said truck frame is so adjusted by the nuts 41 on the adjusting screws 40 as to permit movement of the truck frame relative to the wheels without obtaining engagement between either the upper or lower shoes 84 and the respective drum 22.

In the drawings, the two shoes 84 associated with the disc brake levers 33 in each braking unit are shown equally spaced from the opposite sides of the drum 22. This condition is obtained only when the vehicle carried by the truck is in a semi-loaded condition. When the vehicle carried by the truck is in a fully loaded condition the topmost shoes 84 will be just slightly spaced from the top portion of the drums 22, and the lowermost shoes 84 will be spaced from the lower portion of said drums a considerable distance, while when the vehicle supported by the truck frame is empty the lowermost shoes 84 will be closer to the drums than the uppermost shoes 84. In other words, the position of the upper and lower shoes 84 with respect to the drums 22 in both braking units depends upon and will vary according to the vertical or loaded position of the truck frame 10 with respect to the truck wheels 17, but regardless of such position of the truck frame none of the shoes 84 will engage the drums 22 when the brakes are released.

It will be noted that while springs 75 are provided for moving the cylinder pistons 71 to their release positions shown in the drawings, such movement is independent of the push rods 78 for reasons which will be later brought out.

In order to move the push rods 78 and thereby the shoes 84 to their release position above described, any suitable means may be provided such, for example, as tension springs 93 interposed between and connected at their opposite ends to the equalizer bars 79 and 82, as shown in Fig. 4 of the drawings. These springs 93 are so designed as to exert just sufficient pull on the two equalizer bars 79 and 82 to operate the oppositely disposed pairs of levers 76 for drawing the shoes 84 away from the drums 22 and for maintaining said shoes in such condition while the brakes are released.

When an application of the brakes is effected, as will be hereinafter described, fluid under pressure is adapted to be supplied to chambers 73 between the cylinder pistons 71 to act on said pistons to move same and thereby the push rods 78 outwardly, for thereby rocking the connected levers 76 in such directions as to move the shoe 84 at the ends of said levers in the direction of the respective drums 22.

If at the time the levers 76 are thus operated the truck frame is in its empty and therefore most elevated position, the lowermost shoes 84 will be closer to the drums 22 than the uppermost shoes 84 and as a consequence slight movement of the pistons 71 connected to the lowermost shoes 84 will move such shoes into engagement with the lower portions of the drums 22. The lowermost shoes 84 then become, in effect, fixed fulcrums for the connected levers 76 so that continued outward movement of the connected pistons 71 acts through the pivot pins 77 in the lowermost levers 76 to rock the disc brake levers 33 about the ball and socket connections 37, 38 with transom 13 in a clockwise direction, as viewed in Fig. 2 of the drawings, to thereby pull the upper shoes 84 downwardly toward the upper portion of the drums 22. This rocking movement continues until the uppermost shoes engage the top portion of the drums 22, after which the further pressure applied in chambers 73 to the drum brake cylinder pistons 71 forces the shoes 84 against said drums with sufficient force to create a certain amount of braking of the drums and thereby of the connected truck wheels 17.

If at the time fluid under pressure is supplied to chambers 73 between the centering shoe operating pistons 71, the truck frame is in a depressed, full load position with respect to the truck wheels, in which position the topmost shoes 84 are closer to the drums 22 than the lowermost shoes 84, said topmost shoes will engage said drums upon slight movement of the connected pistons 71. The topmost shoes 84 then become, in effect, fixed fulcrums for the connected levers 76 so that continued outward movement of the actuating pistons 71 acts through the pivot pins 77 to rock the disc brake levers 33 in a counterclockwise direction until the lowermost shoes 84 contact the lower portion of the drums 22, after which all of the shoes 84 are pressed against the drums 22 to effect braking of the truck wheels, as above described.

If at the time fluid under pressure is supplied to the piston chambers 73 the shoes 84 are all spaced substantially the same distance from the drums 22 as shown in the drawings and as would be the case if the truck were in a semi-loaded condition, then the shoes 84 both above and below the drums will be moved into engagement therewith at substantially the same time, as will be evident.

Due to the oppositely disposed pairs of levers 76 in each braking unit being connected together by the equalizer levers 89 and links 90 and 91 it will be noted that both levers in each unit move together and the same amount regardless of which of the shoes 84 engage the drums 22 first, and on account of this action both of the disc brake levers 33 are always moved to the same position with respect to the drums regardless of the elevated position of the vehicle truck frame with respect to the truck wheels.

The non-rotatable braking discs 31 being secured directly to the disc brake levers 33 are adapted to move with said levers relative to the rotatable braking discs 28 upon operation of the brake shoe actuating pistons 71 as above described, and the various parts of the mechanisms are so arranged that at the time the shoes 84 are moved into engagement with both the top and bottom portions of the drums 22, the non-rotatable brake discs 31 will be in concentric relation with the rotatable braking discs 28, regardless of the position which said non-rotatable discs may be in with respect to said rotatable discs before fluid under pressure is supplied to the chambers 73 for operating the pistons 71. In other words, the operation of the pistons 71 by fluid under pressure not only acts to move the shoes 84 into frictional braking engagement with the drums 22, but through one or the other of said shoes acts to rock the disc brake levers 33 in such a direction as to move the non-rotatable braking discs 31 relative to and into concentric relation with the rotatable braking discs 28.

Since the inner non-rotatable braking discs 32 are secured for vertical movement with the non-rotatable braking discs 31 through the medium of rod 53, it will be evident that the braking discs 32 will be moved into concentric braking relation with the rotatable braking discs 28 at the same time as the non-rotatable braking discs 31 are so operated.

In order to effect a release of the brakes as will be later described, fluid under pressure is vented from the piston chambers 73 and the pistons 71 are returned to their normal or release positions, shown in the drawings, by the pressure of springs 75. As the pressure is thus relieved from the push rods 72, the springs 93 connecting the equalizing bars 79 and 82 act to draw the opposite ends of said bars toward each other and thereby operate the levers 76 to return the shoes 84 to their normal position out of engagement with the drums 22, so as to thereby permit the various parts of the brake mechanism to be returned to their normal or brake release positions by the spring supporting devices 56.

As hereinbefore described, the support springs 60 in the supporting devices 56 are provided merely to counterbalance the weight of the non-rotatable discs 30 and 31 and other parts of the mechanism associated with the adjacent portions of levers 33 for normally supporting such parts from the truck frame, while the inner springs 65 in said devices are merely provided to dampen oscillation of the said parts of the brake mechanisms while the brakes are released. Except when the truck frame is in a semi-loaded condition, either one or both of the springs 60 and 65 oppose movement of the mechanisms to the position in which the shoes 84 engage the opposite sides of the drums 22 and in which the non-rotatable braking discs 31 and 32 are in concentric relation with the rotatable braking discs 28, but this is merely incidental and has substantially no detrimental effect upon the braking operation of the mechanisms.

A brake cylinder device 100 for controlling the braking operation of the non-rotatable braking discs 31 and 32 is secured to any suitable part of the truck frame 10, such as end member 12 as shown in Figs. 2 and 3.

The brake cylinder device 100 comprises a casing containing a piston 101 having a piston rod 102 extending through one end of the cylinder 10 and pivotally connected at its outer end to one end of a brake lever 103. The lever 103 extends over the top of axle 16 and its opposite end is pivotally connected to one of the links 47. Another brake lever 104 similar to but disposed opposite to the brake lever 103, is pivotally connected at one end to two oppositely disposed pins or bosses 105 provided diametrically opposite each other on the casing of the brake cylinder device and extends over the top of the axle 16 with the opposite end pivotally connected to the other link 47. The two levers, 103 and 104, are pivotally connected together intermediate their ends by link 106.

The brake cylinder piston 101 has at one side a pressure chamber 107 and at the opposite side a chamber which is open to the atmosphere in any desired manner and in which there is provided a release spring 108 which acts on the piston 101 for urging it to its normal or release position, shown in the drawings.

The pressure chamber 73 between the pistons 71 in the two cylinders 70 are both connected through the pipes 74 to a common pipe 110 which in turn is connected to a pipe 111 to which fluid under pressure is adapted to be supplied for effecting an application of the brakes and from which fluid under pressure is adapted to be released for effecting a release of the brakes. The supply and release of fluid under pressure to and from the pipe 111 may be controlled in any desired manner, as by the operation of the conventional type of triple valve device (not shown) employed on railway vehicles.

Between the fluid pressure supply pipe 111 and a pipe 112 leading to the pressure chamber 107 in the brake cylinder device 100 there is provided a delay valve device 113 which is operative in effecting an application of the brakes to delay operation of the brake cylinder device 100 until after the cylinders 70 have been operated.

The delay valve device 113 comprises a casing containing a valve piston 114 having at one side a chamber 115 which is open to the atmosphere through a passage 116 and which contains a spring 117 acting on said valve piston for urging same into engagement with an annular seat rib 118 provided at its opposite side. The space within the seat rib 118 is open at all times to the pipe 111 while the space around the outside of said seat rib is open to a passage 119 to which the brake cylinder pipe 112 is connected. The passage 119 is also connected by a passage 120 to chamber 115 when the valve piston 114 is in engagement with the seat rib 118; but communication between the passage 120 and chamber 115 is adapted to be closed upon movement of the valve piston 114 out of the position shown in the drawings, as will be hereinafter described.

*Operation*

In operation, when it is desired to decelerate or brake the wheels 17 of the truck, fluid under pressure is supplied to the pipe 111 in any desired manner or by any suitable means and from thence flows through the pipe 110 to the pressure chambers 73 between the pistons 71 in the cylinders 70.

The pressure of fluid thus supplied to chambers 73 moves the pistons 71 in each of the cylinders 70 outwardly in opposite directions and thereby operates the levers 76 to move the shoes 84 into engagement with the opposite top and bottom portions of the drums 22 to effect rocking of the brake disc levers 33 and 39 relative to said drums for moving the non-rotatable braking discs 31 and 32 into concentric, braking relation with the rotatable braking discs 28.

After the shoes 84 are thus moved into contact with the opposite top and bottom portions of the drums 22 for centralizing the non-rotatable braking discs 31 and 32, said shoes are pressed against said drums with a pressure depending upon the pressure of fluid acting on the pistons 71 for thereby effecting a certain degree of braking of said drums and of the connected vehicle wheels 17.

The pressure of spring 117 on the delay valve piston 114 is sufficient to hold said valve piston in sealing engagement with the seat rib 118 until after sufficient pressure has been obtained in the cylinders 70 for centralizing the non-rotatable braking discs 31 and 32 with the rotatable braking discs 28, as just described. A slight increase in the pressure in pipe 111, which pressure acts on the lower face of the valve piston 114 within the seat rib 118, is then adapted to overcome the opposing pressure of spring 117 and move the valve piston 114 out of engagement with the seat rib 118 and into sealing engagement with a gasket 121 for thereby closing communication between passage 120 and the atmospheric vent port 116.

When the valve piston 114 is thus moved out of engagement with seat rib 118 communication is established between the fluid pressure supply pipe 111 and pipe 112 leading to the pressure chamber 107 in the brake cylinder device 100, whereupon fluid under pressure is supplied to said chamber and acts therein on the brake cylinder piston 101 to move said piston and thereby the piston rod 102 outwardly of the device.

This movement of the piston rod 102 acts to move the connected end of the brake lever 103 away from the adjacent end of the lever 104 and, due to the action of link 106 connecting said levers, the opposite ends of said levers are drawn toward each other. Through the medium of the links 47, the connected ends of the two levers 39 are thereby drawn toward each other and away from the ball ends 37 of the levers 33, and since the levers 39 and 33 are connected together by the links 85, the ends of said levers carrying the non-rotatable braking discs 31 and 32 are moved toward each other and thereby act to shift said discs into frictional braking contact with the adjacent faces of the rotatable braking discs 28 for effecting braking of said discs and thereby of the wheels 17.

After the delay valve device 113 operates as just described to supply fluid under pressure to the pressure chamber 107 in the brake cylinder device 100, it will be noted that the same pressure exists in said chamber as in the chambers 73 in the cylinders 70, so that the same fluid pressure is employed for forcing the shoes 84 into frictional contact with the drums 22 as for forcing the non-rotatable braking discs 31 and 32 into frictional contact with the rotatable discs 28, and the degree of this fluid pressure may be varied by varying in the usual manner the pressure of fluid supplied to the pipe 111 for thereby providing any desired degree of braking of the wheels 17.

It will be noted that when the non-rotatable braking discs 31 and 32 are in frictional braking engagement with the rotatable discs 28 the levers 33 and 39 act to hold said non-rotatable discs against turning with the rotatable discs 28, since the outer ends of the levers 33 are supported in the sockets 38 secured to the frame while the outer ends of the levers 39 are supported by the rollers 50 in the ends of the links 47; said rollers being pressed against one or the other of the side walls 48 of the channel element 49, depending upon the direction of rotation of the rotatable braking discs 28. The rollers 50 are provided in the ends of the links 47 to facilitate movement of said links in the channel 49 during the time the non-rotatable braking discs 31 and 32 are in frictional contact with the rotatable braking discs 28.

It will be noted that the wheels 17 are braked by the combined action of the radially movable shoes 84 against the drums 22, and the axially movable non-rotatable braking discs 31 and 32 against the opposite faces 29 of the rotatable braking discs 28, and it will be further noted that the non-rotatable discs 31 and 32 do not contact the rotatable discs 28 to effect braking of said wheels until after the operation of the shoes 84 to centralize said non-rotatable braking discs with said rotatable braking discs.

The parts may be so designed and arranged that the shoes 84 will effect any desired proportion of the braking of the vehicle truck, although it is preferred that the major portion of the braking be effected by the brake discs 31, 32 and 28. Furthermore, the brake discs 32, 31 and 28 may be cut into operation by any suitable means, such as the delay valve device 113 used for the purpose of illustration, and at any desired time after the operation of the shoes into engagement with the drums 22, as will be evident.

In order to effect a release of the brakes after an application fluid under pressure is vented from pipe 111 and thus from the pressure chamber 107 in the brake cylinder device 100 and from chambers 73 in the brake shoe operating cylinders 70, thereby permitting the return spring 108 in the brake cylinder device 100 to move the piston 101 back to its release position, and for also relieving the pressure of the shoes 84 against the drums 22.

When the brake cylinder piston 101 is thus returned to its release position the brake levers 103 and 104 are operated to move the links 47 away from each other for thereby operating the levers 39 and 33 to disengage the non-rotatable friction braking discs 31 and 32 from the rotatable braking discs 28 and to return same to their normal position as shown in Fig. 1 of the drawings.

Any suitable means may be provided to ensure that the non-rotatable discs 31 and 32 will both be disengaged from the rotatable discs 28 when in their normal or release positions, such for instance as the washers 54 on the ends of the support bar 53, it being noted that the non-rotatable discs 31 will be out of engagement with the discs 28 upon engagement of the supporting ears 51 with said washers which occurs prior to the brake cylinder piston 101 obtaining its release position, so that the remaining movement of said piston will ensure the non-rotatable discs 32 being moved away from the discs 28.

When the shoes 84 are released from the drums 22, the springs 93 connecting the equalizing bars 79 and 82 return said shoes to their normal positions whereupon the springs 60 in the spring supporting devices 57 act to return the connected ends of the brake levers 33 and 39 and the parts of the braking mechanism associated therewith to their normal position, supported from the truck frame 10.

When in effecting a release of the brakes the pressure of fluid in pipe 111 acting on the lower face of the delay valve piston 114 is reduced sufficiently, the spring 117 moves said valve piston out of engagement with gasket 121 and back to its normal position engaging the seat rib 118. In this position the passage 120 is open to chamber 115 and from thence to the atmosphere through passage 116, so that any fluid remaining in the brake cylinder device 100 at this time is released by way of said passage.

Hand brake

All railway vehicles must be provided with some type of auxiliary or hand controlled braking means for holding the vehicle stopped. According to the present invention manually operated means are provided for moving the shoes 84 into frictional contact with the drums 22.

The hand brake means, employed for the purpose of illustration, comprises an equalizer lever 122 pivotally mounted intermediate its ends on a pin 123 provided in a bracket 150 which is secured to the truck transom 13 between the cylinders 70. One end of the equalizer lever 122 is connected by a link 124 to the lower equalizer bar 82 midway between its ends, while the other end of said equalizer lever is connected by a link 125 to the mid-portion of the equalizer bar 79; the link 125 being so formed as to pass up between the two brake levers 103 and 104 and to not interfere with their operation, hereinbefore described.

The equalizer lever 122 is provided with an extension 126 which projects from the end connected to the link 124, and connected to the end of this extension is one end of the usual chain 127 which forms a part of the usual hand operated brake mechanism on railway vehicles.

Operation of hand brake mechanism

When it is desired to apply the brakes on the vehicle truck manually, the chain 127 is operated by the usual brake mast arrangement (not shown) on the vehicle to rotate the equalizer lever 122 in a clockwise direction as viewed in Fig. 4 of the drawings. This movement of the equalizer lever 122 operates the links 124 and 125 to move the equalizer bars 79 and 82 apart which thereby operates the brake levers 76 at the opposite sides of the truck to move the shoes 84 into frictional braking contact with the brake drums 22. The degree of pressure thus applied to the drums 22 by the shoes 84 depends upon the force manually applied to the chain 127, and since this pressure is applied to the two equalizer bars 79 and 82 midway between their ends it is equally distributed between the shoes 84 at both sides of the truck, as will be evident. It will also be noted that since the equalizer lever 122 is pivotally mounted on the bracket 120, secured to transom 13, the bars 79 and 82 are both moved from their normal position the same amount, thereby insuring operation of the shoes 84 both above and below the drums 22.

When the brakes are applied manually, as just described, it will be noted that the push rods 78 freely move relative to the pistons 71 in the cylinders 70 thereby avoiding having to compress the release springs 75 in said cylinders during hand brake operation. It is, of course, understood that during hand brake operation the springs 93 connecting the equalizing bars 79 and 82 oppose such operation, but such springs are relatively light as compared to the springs 75.

The openings at the ends of the equalizer bars 79 and 82 through which the pivot pins 81 extend are slightly elongated in the direction of the length of said bars so that if during hand brake operation one end of the bars moves ahead of the other end and thereby moves certain of the shoes 84 into contact with the drums 22 before the other shoes engage said drums, there will be no binding between said bars and the piston rods 78, so as to thus insure equalized movement of both of said bars.

Modification of the invention shown in Fig. 6

As above pointed out, either one or both of the springs 60 and 65 in the spring supporting devices 56 oppose operation of the centralizing shoes 84 to hold the nonrotatable discs 31 and 32 in concentric braking relation with the rotatable discs 28. This is not detrimental insofar as operation of the mechanism is concerned, but at times it will result in unequal loading of the shoes 84 either above or below the drums 22, according to the loaded or elevated position of the truck frame, and consequently is liable to cause excessive or uneven wear of the shoes either above or below the drums.

In order to obviate the condition just described it is proposed to disconnect the spring supporting devices 56 from the brake levers 33 at the time an application of the brakes is effected and to connect said levers to said devices only while the brakes on the truck are released. By such an arrangement, the springs 60 and 65 will be effective while the brakes are released for resiliently supporting the nonrotatable discs 31 and 32 and associated parts of the brake mechanism from the truck frame 10 in the same manner as in the construction shown in Figs. 1 to 5 of the drawings and above described, but said springs will not act to urge the shoes 84 against the brake drums 22 while the brakes are applied.

Any suitable means may be employed to accomplish the above result, such as the structure shown in Fig. 6 of the drawings which is employed for the purpose of illustration and which comprises for use at both sides of the truck, a spring supporting device 56' which is the same as that shown in Fig. 5 of the drawings except for the plunger indicated by the reference character 57'. The plunger 57' is provided with an axial bore open at the lower end of the plunger, and slidably mounted in said bore is an element 127 pivotally connected at its lower end to the bar 53.

The element 127 is provided with a transverse opening having tapered sides and at each side of said opening, the plunger 57' is provided with tapered openings adapted to be moved into alignment therewith. Slidably mounted in these openings in the element 127 and plunger 57' is a cam in the shape of a tapered key 128, the sides of which are adapted, when the key is forced home, to engage the tapered sides of the openings in both said element and plunger for providing a tight connection between said element and plunger.

When the key 128 is forced home as just described, the springs 60 and 65 in the spring supporting device 56' are rendered effective to support the disc brake levers, non-rotatable discs 31 and 32 and other associated parts of the brake mechanisms in the same manner as hereinbefore described in connection with the construction shown in Figs. 1 to 5 of the drawings.

The brake lever 33 adjacent each spring supporting device 56' is provided on its upper arm portion 34 with an inwardly extending, upturned bracket 129 the end of which provides the pressure end of a vertically disposed fluid pressure operated cylinder device 130. The cylinder device 130 comprises a casing containing a piston 131 having at the side facing the bracket 129 a pressure chamber 132 and at the opposite side a non-pressure chamber 133. The piston 131 is provided with a piston rod 134 extending through the non-pressure chamber 133 and end wall thereof. A spring 135 in the non-pressure chamber 133 acts on the piston 131 to urge it to the normal position shown in the drawings.

A bell crank lever 136 is pivotally mounted on a bracket 137 projecting from the casing of the brake cylinder device. One end of this bell crank lever is pivotally connected to the end of the piston rod 134 while the opposite end is pivotally connected to a portion 138 of reduced section extending from the small end of the cam 128.

The pressure chamber 132 in the cylinder device 130 is connected to a pipe 139 which in turn is connected to pipe 110 through which fluid under pressure is supplied to and released from the centralizing piston chambers 73 as hereinbefore described. By this arrangement, when fluid under pressure is supplied through pipes 110 and 74 to the centralizing piston chambers 73 to effect operation of the centralizing shoes 84 to move the non-rotatable discs 31 and 32 into concentric braking relation with the rotatable braking discs 28, fluid under pressure from pipe 110 also flows to pipe 139 and from thence into piston chamber 132 in the cylinder 130 associated with each of the disc brake levers 33.

The pressure of fluid supplied to chamber 132 in each of the cylinders 130 acts therein to move the piston 131 outwardly of the respective cylinder. This movement of piston 131 rocks the connected bell crank lever 136 in a clockwise direction which moves the cam 128 relative to the plunger 57' and element 127 in a direction out of the openings in said plunger and element, as viewed in Fig. 6 of the drawings.

As the cam 128 is thus moved out of the openings in the plunger 57' and element 127, said element and thereby the bar 53 and non-rotatable discs 31 and 32 are released from the springs 60 and 65 and thus movable independently of said springs to whatever position the disc supporting levers 33 and 39 are moved by the centralizing shoes 84, and by this arrangement neither the upper nor lower shoes 84 are subjected to the pressure of springs 60 and 65 when engaging the drums 22.

The release movement, above mentioned, of the cam 128 may be defined in any desired manner by engagement of the actuating piston 131 with a shoulder 140 provided in the cylinder 130. This release movement is of course sufficient to compensate for the inward movement of the plunger 57' in each of the supporting devices 56' by the spring 60 therein upon disconnecting the respective brake levers 33 and 39 and associated parts of the brake mechanism from the plunger 57'. However, each of the springs 60 is preferably so designed that there is only a slight deflection from the position assumed when supporting said parts to its free position, so that the inward movement of the connected plunger 57' upon disconnecting same from the respective brake levers is relatively small and therefore does not have any appreciable effect upon the design of the cam to provide for complete release of said brake levers from the spring supporting devices, as above described.

When a release of the brakes is effected, fluid under pressure is released from the piston chamber 132 in each of the cylinders 130 along with the release of fluid under pressure from the centralizing piston chambers 73. Thus at the same time as the centralizing shoes 84 are released from the drums 22, the pressure of spring 135 on the piston 131 in the cylinders 130 returns said piston to its normal position shown in the drawings and through the connected bell crank lever 136 draws the cam 128 into the openings in the plunger 57' and element 127 to return said element to its normal position shown in the drawings. As the cam 128 is thus drawn home to its normal position, the opposite sides thereof cooperate with the adjacent side walls of the openings in the plunger 57' and element 127 to move said element relative to said plunger for thereby returning the connected levers 33 and 39 and associated parts of the brake mechanism to their normal position with respect to the truck frame for support from the devices 56'.

Slight clearance space is provided on the pressure side of piston 131 in each of the cylinders 130 when said piston is in its release position, so that the spring 135 acting on said piston is operative at all times while the brakes are released to urge the cam in the direction for providing a tight connection between the plunger 57' and element 127.

*Modification of the invention shown in Fig. 7*

Although it may be desirable at all times to resiliently support the levers 33 and 39 and associated parts of the brake mechanisms from the truck frame 10 on springs or the like, such as springs 60 employed in the spring supporting devices 56, and 56', it is not essential, where means, such as the cams 128, is employed for disconnecting said levers and parts from the truck frame at the time an application of the brakes is effected. A structure wherein the levers 33 and associated parts of the brake mechanism is rigidly supported from the truck frame while the brakes are released and disconnected from said frame when the brakes are applied is shown in Fig. 7 of the drawings.

In the structure shown in Fig. 7, no spring supporting devices, such as 56 or 56', above described, are employed as will be evident, but instead, a support member or strut 141 is used to provide a connection between the element 127 and the adjusting screw 40 secured to the truck frame member 58. The upper end of the member 141 is pivotally connected directly to the screw 40, while the lower end is formed like the corresponding end of the plunger 57' in the structure shown in Fig. 6 to slidably receive the element 127 and cam 128 which correspond in structure and operation to like parts shown in Fig. 6.

When the brakes on the truck are released, the element 127 is connected directly by the cam 128 to the element 141 so that the parts of the brake mechanism carried by the element 127 are supported directly from the truck frame through a substantially rigid connection, as will be evident, while when an application of the brakes is effected, the cam 128 is operated in the same manner as hereinbefore described to release the element 127 and parts of the brake mechanisms carried thereby from the truck frame to move to their centralized position with respect to the parts of the brake mechanisms carried by the truck wheels.

*Summary*

From the above description it will be noted that the improved braking system embodies two like, but oppositely disposed braking units, each of which units comprises a combined centering and drum brake mechanism having radially movable combined centering and braking elements and a disc brake mechanism having axially movable braking elements; the several brake mechanisms being cooperative to effect braking of a pair of truck wheels. All parts of both mechanisms, except the rotatable parts secured to the truck wheels, are normally supported from the truck frame either resiliently or rigidly and adapted to move therewith relative to the truck wheels. The radially movable centering and brake mechanisms are operative however at the time an application of the brakes is effected on the truck wheels to move the parts of both mechanisms carried by the truck frame relative to and into cooperative relation with the parts secured to the truck wheels, following which the mechanisms in both units are operative to brake the truck wheels. The radially movable brake mechanisms thus serve two functions, first the function of moving the various parts of the brake mechanisms into cooperative relation, and secondly, the function of braking in cooperation with the axially movable braking elements.

It is important to note that the centering and drum brake mechanism is readily adapted for control by hand from the usual hand operated arrangements provided on railway vehicles.

In the structures employed for illustration, the drums 22 are shown as provided on elements removably secured to the wheels 17, but it is not intended to limit the scope of the invention to this structure per se, since drums located and supported differently could serve the same purpose, and in fact the same result could be accomplished by arranging the mechanism including the brake shoes 84 to cooperate with the treads of the wheels 17, if such were desired.

Various other modifications of the invention are contemplated and it is therefore not the intention to limit the scope of the invention to the embodiments shown and described or otherwise than by the terms of the appended claims.

Having now described my invention, what I claim as new and desire to secure by Letters Patent, is:

1. A brake arrangement for a vehicle truck having a rotatable structure adapted to be braked for braking said truck, said rotatable structure having two different annular braking surfaces, a movable, friction braking member adapted to frictionally engage one of said surfaces for effecting braking of said truck, another movable, friction braking member adapted to frictionally engage the other of said braking surfaces for effecting further braking of said truck and means for controlling the operation of both of said friction braking members and operative to effect operation of first one and then the other of said braking members.

2. A brake arrangement for a vehicle truck having a rotatable structure adapted to be braked for braking said truck, said rotatable structure having an annular braking surface arranged radially to the axis of rotation of said structure and also having an annular braking surface arranged at an angle to the radial braking surface, a braking member operative to frictionally engage the angular braking surface on said structure to effect braking of said truck, a braking member operative to frictionally engage said radial surface to effect further braking of said truck, and means for controlling the operation of both of said braking members and operative to effect operation first of the first mentioned braking member and then the other of said braking members.

3. A brake arrangement for a vehicle truck having a rotatable element adapted to be braked for braking said truck, said rotatable element having a cylindrical braking surface and a radial braking surface, a radially movable friction braking member arranged to frictionally engage said cylindrical surface for braking said element, an axially movable friction braking member arranged to frictionally engage said radial braking surface for braking said element, and means for controlling the operation of said braking members, said means being so constructed and arranged as to effect operation of first one of said braking members and then the other of said braking members.

4. A brake arrangement for a vehicle truck having a rotatable element adapted to be braked for braking said truck, said rotatable element having a cylindrical braking surface and a radial braking surface, a radially movable friction braking member arranged to frictionally engage said cylindrical surface for braking said element, an axially movable friction braking member arranged to frictionally engage said radial braking surface for braking said element, means operative by fluid under pressure to effect operation of said radially movable braking member, means operative by fluid under pressure to effect operation of said axially movable braking member, a communication through which fluid under pressure may be supplied to both of said means, and valve means operative to admit fluid under pressure to the second mentioned means only after the pressure of fluid being supplied to the first mentioned means has been increased to a predetermined value.

5. A brake arrangement for a vehicle truck having a rotatable element adapted to be braked for braking said truck, said rotatable element having a cylindrical braking surface and a radial braking surface, a radially movable friction braking member arranged to frictionally engage said cylindrical surface for braking said element, an axially movable friction braking member arranged to frictionally engage said radial braking surface for braking said element, a brake cylinder operative by fluid under pressure to effect the operation of said radially movable braking member, another brake cylinder operative by fluid under pressure to effect the operation of said axially movable braking member, and valve means operative upon the build up of a predetermined pressure in the first mentioned means for admitting fluid under pressure to the second mentioned means.

6. A brake arrangement for a vehicle truck having a rotatable element adapted to be braked for braking said truck, said rotatable element having a cylindrical braking surface, and a radial braking surface, a radially movable friction braking member arranged to frictionally engage said cylindrical surface for braking said element, an axially movable friction braking member arranged to frictionally engage said radial braking surface for braking said element, a brake cylinder operative by fluid under pressure to effect the operation of said radially movable braking member, another brake cylinder operative by fluid under pressure to effect the operation of said axially movable braking member, and means operative when the pressure of fluid supplied to the first mentioned means exceeds that normally required to effect the operation of the means for effecting the operation of the second mentioned means.

7. A brake arrangement for a vehicle truck having a rotatable element adapted to be braked for braking said truck, said rotatable element having a cylindrical braking surface and a radial braking surface, a radially movable friction braking member arranged to frictionally engage said cylindrical surface for braking said element, an axially movable friction braking member arranged to frictionally engage said radial braking surface for braking said element, a brake cylinder operative by fluid under pressure to effect the operation of said radially movable braking member, another brake cylinder operative by fluid under pressure to effect the operation of said axially movable braking member, a communication through which fluid under pressure may be supplied to said brake cylinders, and means controlled by the pressure of fluid supplied to one of said brake cylinders for controlling the supply of fluid under pressure to the other of said brake cylinders.

8. A brake arrangement for a vehicle truck having a rotatable element adapted to be braked for braking said truck, said rotatable element having a cylindrical braking surface and a radial braking surface, a radially movable friction braking member arranged to frictionally engage said cylindrical surface for braking said element, an axially movable friction braking member arranged to frictionally engage said radial braking surface for braking said element, a brake cylinder operative by fluid under pressure to effect the operation of said radially movable braking member, another brake cylinder operative by fluid under pressure to effect the operation of said axially movable braking member, a communication through which fluid under pressure may be supplied directly to one of said brake cylinders, and means controlled by the pressure of fluid supplied to said one brake cylinder for delaying the supply of fluid under pressure from said communication to said other brake cylinder.

9. A brake arrangement for a vehicle truck having a rotatable element adapted to be braked for braking said truck, said rotatable element having a cylindrical braking surface and a radial braking surface, a radially movable friction braking member arranged to frictionally engage said cylindrical surface for braking said element, an axially movable friction braking member arranged to frictionally engage said radial braking surface for braking said element, a brake cylinder operative by fluid under pressure to effect the operation of said radially movable braking member, another brake cylinder operative by fluid under pressure to effect the operation of said axially movable braking member, means providing a communication between said brake cylinders through which fluid under pressure is adapted to be supplied to said brake cylinders for controlling the operation thereof, and valve means for controlling said communication and operative to close said communication and to vent one of said brake cylinders while the pressure in the other of said brake cylinders is below a predetermined degree, and operative upon obtaining a predetermined fluid pressure in the last named brake cylinder to close the vent to the one brake cylinder and to open said communication.

10. A brake arrangement for a vehicle wheel comprising means associated and rotatable with said wheel and having a cylindrical braking surface and an annular, radial braking surface, a brake member arranged for radial movement into frictional braking engagement with said cylindrical braking surface, another brake member arranged for axial movement into frictional braking engagement with said radial braking surface, and means for controlling the operation of said brake members and arranged to effect movement of first one of said members and then of the other into braking contact with their respective braking surfaces.

11. A brake arrangement for a vehicle wheel comprising means associated and rotatable with said wheel and having a cylindrical braking surface and an annular, radial braking surface constituting, respectively, the braking surfaces of a brake drum and of a brake disc, a brake member arranged for radial movement into frictional braking engagement with said brake drum, a brake member arranged for axial movement into frictional braking engagement with said brake disc, and means for controlling the operation of said braking members and operative to effect the braking operation of first one of said members and then of the other members.

12. A brake arrangement for a vehicle wheel comprising a sleeve-like element having a central cylindrical portion constituting a brake drum and an outwardly flaring frustro-conical shaped portion at one end of said drum secured to said wheel adjacent the periphery thereof for rotating said element with said wheel, a brake disc associated with said sleeve-like element at the opposite end of said drum and rotatable with said wheel, a brake member arranged for axial movement into frictional braking engagement with said brake disc, and means for controlling the operation of said braking members and operative to effect the braking operation of first one of said members and then of the other member.

13. A brake arrangement for a wheel of a railway vehicle comprising a horizontally extending drum rotatably associated with said wheel, said drum having a peripheral braking surface and spaced vertically disposed annular braking surfaces, a plurality of friction shoes disposed in clasp arrangement about said peripheral braking surface for braking engagement with the surface, and two annular friction discs arranged only for braking engagement with each of said annular braking surfaces.

14. A brake arrangement for a wheel of a railway vehicle comprising a horizontally extending drum rotatably associated with said wheel, said drum having a peripheral braking surface and spaced vertically disposed annular braking surfaces, a plurality of friction shoes disposed in clasp arrangement about said peripheral braking surface for braking engagement with the surface, two annular friction discs arranged one for braking engagement with each of said annular braking surface, fluid pressure means for actuating said shoes, fluid pressure means for actuating said discs, and means providing for the operation of the first mentioned means prior to the operation of the second mentioned means.

15. A brake arrangement for a wheel of a railway vehicle comprising a horizontally extending drum rotatably associated with said wheel, said drum having a peripheral braking surface and spaced vertically disposed annular braking surfaces, a plurality of friction shoes disposed in clasp arrangement about said peripheral braking surface for braking engagement with the surface, two annular friction discs arranged one for braking engagement with each of said annular braking surface, fluid pressure means for actuating said shoes, fluid pressure means for actuating said discs, and means responsive to the pressure of fluid supplied to the first mentioned means when such pressure is increased to a predetermined value for admitting fluid under pressure to the second mentioned means to effect the operation of the second mentioned means.

16. A brake arrangement for a vehicle truck comprising a rotatable friction braking structure adapted to be braked for braking said truck, said rotatable structure having a cylindrical braking surface and an adjacent annular disc-like portion provided with a radial braking surface, braking means adapted to be moved into frictional braking engagement with both of said surfaces for braking said truck, said structure also having a plurality of spaced, radially arranged air ducts extending through said disc-like portion adjacent to said radial surface and open at their inner ends adjacent said cylindrical braking surface and at their outer ends to the atmosphere whereby upon rotation of said structure, a circulation of air is established over said cylindrical surface and through said ducts to the atmosphere for dissipating heat from both of said surfaces.

17. A brake arrangement for a vehicle truck having a rotatable member adapted to be braked for braking said truck and also having a resiliently supported truck frame capable of movement vertically relative to said rotatable member, said rotatable member having an annular braking surface extending parallel to the axis of rotation of said member, a plurality of movable braking members adapted to frictionally engage circumferentially spaced portions of said braking surface for braking said rotatable member, actuating means for moving said braking members into frictional engagement with said surface, means for supporting said braking members from said frame for movement therewith when disengaged from said surface, means for limiting movement of all of said braking members to the same degree, engagement between said surface and one of said braking members upon operation thereof by said actuating means being operative to move another of said braking members relative to said truck frame into concentric braking relation with said surface.

18. A brake arrangement for a vehicle truck having a rotatable member adapted to be braked for braking said truck and also having a resiliently supported truck frame capable of movement vertically relative to said rotatable member, said rotatable member having an annular braking surface extending parallel to the axis of rotation of said member, a pair of oppositely disposed brake shoes arranged to frictionally engage said surface at diametrically opposite top and bottom portions of said rotatable member for braking said member, means for moving said shoes into engagement with said surface, means for supporting said shoes from said frame for movement therewith when said shoes are disengaged from said surface, engagement of one of said shoes with said surface being operative to move the other of said shoes into engagement with said surface, and means for limiting the extent of movement of both of said shoes to the same degree.

19. A brake arrangement for a vehicle truck having a rotatable member adapted to be braked for braking said truck and also having a resiliently supported truck frame capable of movement vertically relative to said rotatable member, said rotatable member having an annular braking surface extending parallel to the axis of rotation of said member, a pair of oppositely disposed brake shoes adapted to frictionally engage said surface at diametrically opposite top and bottom portions of said rotatable member for braking said member, levers for moving said brake shoes into engagement with said surface, actuating means for operating said levers, mechanism associated with said levers for effecting movement thereof in unison, a supporting member carrying said levers and shoes, and means for carrying said supporting member from said frame and operative upon operation of said actuating means to permit movement of said supporting member relative to said frame to effect engagement of both of said shoes with said surface.

20. A brake arrangement for a vehicle truck having a rotatable member adapted to be braked for braking said truck and also having a resiliently supported truck frame capable of movement vertically relative to said rotatable member, said rotatable member having an annular braking surface extending parallel to the axis of rotation of said member, a pair of oppositely disposed brake shoes adapted to frictionally engage said surface at diametrically opposite top and bottom portions of said rotatable member for braking said member, a supporting member, a lever for each of said shoes carried by said supporting member, actuating means associated with said supporting member for operating said levers to move said shoes into braking engagement with said surface, means connecting said levers for effecting movement thereof in unison, and means connecting said supporting member to said frame for normally supporting said supporting member, levers and shoes from said frame and operative upon operation of said actuating means to permit movement of said member, levers and shoes relative to said frame to effect braking engagement between both of said shoes and said surface.

21. A brake unit for a vehicle truck having a rotatable structure adapted to be braked for braking said truck and also having a resiliently supported truck frame capable of vertical movement relative to said rotatable structure, said rotatable structure having two annular friction braking surfaces one of which is arranged at an angle less than a right angle to the axis of rotation of said rotatable member, a non-rotatable friction braking member for each of said surfaces adapted to be moved into frictional engagement therewith for braking said structure, means for actuating said non-rotatable braking members, means for supporting said non-rotatable braking members from said frame for movement therewith, and means operative upon movement of one of said non-rotatable braking members into engagement with said one braking surface for moving the other braking member relative to said frame into braking relation with the other braking surface.

22. A brake unit for a vehicle truck having a rotatable structure adapted to be braked for braking said truck and also having a resiliently supported truck frame capable of vertical movement relative to said rotatable structure, said rotatable structure having an annular, radial friction braking face and also having an annular friction braking face formed at an angle to said radial face, a non-rotatable friction braking element adapted to be moved into frictional braking engagement with said radial friction face for braking said structure, another non-rotatable friction braking element adapted to be moved into frictional braking engagement with the friction face formed at an angle to said radial face, means for normally supporting said non-rotatable braking elements from said frame for movement therewith, means for actuating said non-rotatable elements, and means connecting said non-rotatable elements and operative upon movement of the non-rotatable element into engagement with the braking face formed at an angle to the radial face to move the other non-rotatable element relative to said frame into braking relation with said radial face.

23. A brake unit for a vehicle truck having a rotatable structure adapted to be braked for braking said truck and also having a resiliently supported truck frame capable of vertical movement relative to said rotatable structure, said rotatable structure comprising a disc-like portion having an annular, radially formed friction braking surface and a drum-like portion having a cylindrical, friction braking surface, a non-rotatable friction braking element for each of said surfaces adapted to be moved into frictional engagement therewith for braking said structure, means for normally supporting said non-rotatable friction braking elements from said frame for movement therewith, means of sequentially actuating said non-rotatable braking elements into engagement first with said cylindrical surface and then said radial surface, and means operative upon engagement of one non-rotatable braking element with said cylindrical surface to move the other non-rotatable braking element relative to said frame into braking relation with said radial surface.

24. A brake unit for a vehicle truck having a rotatable structure adapted to be braked for braking said truck and also having a resiliently supported truck frame capable of vertical movement relative to said rotatable structure, said rotatable structure having an annular, radially formed friction braking surface and a concentric, cylindrical braking surface, a non-rotatable friction braking disc adapted to frictionally engage said radially formed braking surface, a non-rotatable braking element adapted to frictionally engage said cylindrical surface, means for normally supporting said braking disc and said braking element for movement with said frame, means for moving said braking element relative to said frame into braking engagement with said cylindrical surface, means operative upon engagement of said braking element with said cylindrical surface to effect movement of said braking disc relative to said frame into concentric relation with said radial braking surface, and means for moving said braking disc into braking engagement with said radial braking surface.

25. A brake unit for a vehicle truck having a rotatable structure adapted to be braked for braking said truck and also having a resiliently supported truck frame capable of vertical movement relative to said rotatable structure, said rotatable structure having an annular, radially formed friction braking surface and a concentric, cylindrical braking surface, a non-rotatable friction braking disc normally carried by said frame and adapted to be moved relatively thereto into concentric relation with said radially formed face, a non-rotatable braking element movable into frictional engagement with said cylindrical surface, means for actuating said non-rotatable element and connected to said non-rotatable disc and operative upon engagement of said non-rotatable element with said cylindrical surface to move said disc relative to said frame into concentric relation with said radial surface, and means for moving said disc into frictional braking engagement with said radial surface.

26. A brake unit for a vehicle truck having a rotatable structure adapted to be braked for braking said truck and also having a resiliently supported truck frame capable of vertical movement relative to said rotatable structure, said rotatable structure having two annular, friction braking surfaces one of which is formed at an angle smaller than a right angle to the axis of rotation of said rotatable structure, a non-rotatable braking element for frictionally engaging the last named braking surface, an annular non-rotatable braking member for frictionally engaging the other braking surface, means for normally supporting said non-rotatable braking element and member from said frame for movement therewith, means for moving said non-rotatable element into frictional engagement with said one braking surface and operatively connected to said braking member for then moving said braking member relative to said frame into concentric braking relation with said other surface, and actuating means for moving said braking member into frictional engagement with said other surface.

27. A brake unit for a vehicle truck having a rotatable structure adapted to be braked for braking said truck and also having a resiliently supported truck frame capable of vertical movement relative to said rotatable structure, said rotatable structure having two annular, friction braking surfaces one of which is formed at an angle smaller than a right angle to the axis of rotation of said rotatable structure, a non-rotatable braking element for frictionally engaging the last named braking surface, an annular non-rotatable braking member for frictionally engaging the other braking surface, means for normally supporting said non-rotatable braking element and member from said frame for movement therewith, means for moving said non-rotatable element into frictional engagement with said one braking surface and operatively connected to said braking member for then moving said braking member relative to said frame into concentric braking relation with said other surface, actuating means for moving said braking member into frictional engagement with said other surface, and means for delaying the operation of said actuating means until after said braking member is moved into said concentric relation with said other surface.

28. A brake unit for a vehicle truck having a rotatable structure adapted to be braked for braking said truck and also having a resiliently supported truck frame capable of vertical movement relative to said rotatable structure, said rotatable structure having two annular, friction braking surfaces one of which is formed at an angle smaller than a right angle to the axis of rotation of said rotatable structure, a pair of oppositely disposed brake shoes arranged to frictionally engage opposite, top and bottom portions of the last named braking surface, actuating means for moving said shoes into engagement with said last named surface, means for limiting the extent of movement of said shoes to the same degree, a non-rotatable friction braking member adapted when in concentric relation with the other of said surfaces to be moved into frictional engagement therewith, means for actuating said braking member, means for normally supporting said shoes and braking member from said frame, and means connecting said braking member and shoes operative by said actuating means upon movement of one of said shoes into engagement with the one braking surface on said structure to move said braking member relative to said frame into concentric braking relation with said other surface on said structure.

29. A brake unit for a vehicle truck having a rotatable structure adapted to be braked for braking said truck and also having a resiliently supported truck frame capable of vertical movement relative to said rotatable structure, said rotatable structure having two annular, friction braking surfaces one of which is formed at an angle smaller than a right angle to the axis of rotation of said rotatable structure, a support member carried by said frame for movement therewith, a pair of oppositely disposed brake shoes carried by said member and adapted to be moved relatively thereto into frictional engagement with opposite top and bottom portions of said one surface, means for equalizing the movement of said shoes relative to said member for moving said member relative to said frame to a predetermined position with respect to the other of said surfaces upon engagement of both of said shoes with said one surface, and a brake member carried by said supporting member and positioned thereby in said predetermined position in concentric relation with the said other surface for frictional engagement therewith, and actuating means for said shoes and brake member.

30. A brake unit for a vehicle truck having a rotatable structure adapted to be braked for braking said truck and also having a resiliently supported truck frame capable of vertical movement relative to said rotatable structure, said rotatable structure having two annular, friction braking surfaces one of which is formed at an angle smaller than a right angle to the axis of rotation of said rotatable structure, a plurality of brake shoes arranged to engage circumferentially spaced portions of the last named braking surface, actuating means for moving said brake shoes into engagement with said last named surface, means for equalizing the movement of said brake shoes, a non-rotatable friction braking member adapted when in concentric relation with the other of said surfaces to be moved into frictional engagement therewith, means for actuating said braking member, means for normally supporting said shoes and braking member from said frame for movement therewith, and means connecting said braking member and shoes operative upon movement of said shoes into engagement with said last named surface to move said braking member relative to said frame into concentric relation with said other surface.

31. A brake unit for a vehicle truck having a rotatable structure adapted to be braked for braking said truck and also having a resiliently supported truck frame capable of vertical movement relative to said rotatable structure, said rotatable structure having an annular, radial braking surface and an annular braking surface arranged at an angle to said radial braking surface, a member connected to said frame and normally movable therewith, a pair of substantially horizontally disposed levers carried by said member, a brake shoe carried by each of said levers for frictional braking engagement with substantially opposite top and bottom portions of the last named surface, means for actuating said levers to move said shoes into engagement with said last named surface, means for equalizing the movement of said shoes whereby engagement of one of said shoes with said last named surface ahead of the other shoe will move said member relative to said frame to a predetermined position in which both shoes engage said last named surface, a friction braking disk carried by said member and adapted in said predetermined position to be in concentric relation with said radial braking surface, and means for moving said disk into braking engagement with said radial surface.

32. A brake unit for a wheel of a vehicle truck having a frame resiliently supported from said wheel, comprising a structure rigidly secured to said wheel for rotation therewith and having an annular, radial braking surface and another annular braking surface formed at an angle to said radial surface, an annular friction disc for frictionally engaging said radial surface, friction braking elements movable in unison into braking engagement with circumferentially spaced portions of said other braking surface, means normally supporting said disc and friction braking elements from said frame and means connecting said disc to said friction elements operative upon movement thereof into engagement with said other surface to move said disc relative to said frame into concentric relation with said radial surface.

33. A brake unit for a wheel of a vehicle truck having a frame resiliently supported from said wheel, comprising a structure rigidly secured to said wheel for rotation therewith and having an annular, radial braking surface and another annular braking surface formed at an angle to said radial surface, a member carried by said frame and capable of movement relatively thereto, braking means carried by said member for frictionally engaging said other surface, actuating means for said braking means carried by said member and so arranged as to move said member to a predetermined position with respect to said radial surface upon movement of said braking means into braking engagement with said other surface, and an annular friction disc for frictionally engaging said radial surface carried by and movable with said member and positioned in said predetermined position of said member in concentric braking relation with said radial braking surface.

34. A brake unit for a wheel of a vehicle truck having a frame resiliently supported from said wheel, comprising a sleeve rigidly secured to said wheel for rotation therewith and having a cylindrical braking surface, a brake disc secured to rotate with said sleeve and having a radial braking surface, a non-rotatable disc for frictionally engaging said radial braking surface, a disc brake lever carrying said disc and supported from said frame for movement therewith, means for operating said lever to move said disc into braking engagement with said radial surface, a pair of brake shoes one disposed above and the other below said cylindrical surface for braking engagement therewith, a shoe lever carried by said disc brake lever for operating one of said shoes, another shoe lever carried by said disc brake lever for operating the other shoe, means for operating said levers to move said shoes relative to said disc brake lever into frictional engagement with said cylindrical surface, means for equalizing the movement of said shoes relative to said disc brake lever whereby said disc brake lever is movable relative to said frame to a predetermined position with respect to said radial braking surface upon engagement of both of said shoes with said cylindrical surface, said disc being so associated with said disc brake lever as to be in concentric relation with said radial surface upon engagement of both of said shoes with said cylindrical surface.

35. A brake unit for a wheel of a vehicle truck having a frame resiliently supported from said wheel, comprising a sleeve rigidly secured to said wheel for rotation therewith and having a cylindrical braking surface, a brake disc secured to rotate with said sleeve and having a radial braking surface, a non-rotatable disc for frictionally engaging said radial braking surface, a disc brake lever carrying said disc and supported from said frame for movement therewith, means for operating said lever to move said disc into braking engagement with said radial surface, a pair of brake shoes one disposed above and the other below said cylindrical surface for braking engagement therewith, a shoe lever carried by said disc brake lever for operating one of said shoes, another shoe lever carried by said disc brake lever for operating the other shoe, a cylinder device operative by fluid under pressure for operating said levers to move said shoes relative to said disc brake lever into frictional engagement with said cylindrical surface, means for equalizing the movement of said shoes relative to said disc brake lever whereby said disc brake lever is movable relative to said frame to a predetermined position with respect to said radial braking surface upon engagement of both of said shoes with said cylindrical surface, said disc being movable with said member and so arranged as to be in concentric relation with said radial surface upon movement of said member to said predetermined position; the disc brake lever operating means being a fluid pressure operated cylinder device, and means operative to delay the operation of the last named cylinder device until after the operation of the first named cylinder device to move said shoes into engagement with said cylindrical surface.

36. A brake arrangement for a vehicle truck having a rotatable element adapted to be braked for braking said truck, said rotatable element having two braking surfaces, non-rotatable friction braking means adapted to frictionally engage one of said surfaces for braking said element, non-rotatable friction braking means adapted to frictionally engage the other of said surfaces for further braking said element, means operative by fluid under pressure to effect operation of both of said non-rotatable means, and means connected to one of said friction braking means operative manually to effect the operation of said one friction braking means independently of the other friction braking means.

37. A brake arrangement for a vehicle truck having a rotatable element adapted to be braked for braking said truck and having a resiliently supported truck frame, said element having two annular braking surfaces, non-rotatable friction braking means carried by said frame adapted to frictionally engage one of said surfaces for braking said truck and movable relative to said frame into braking relation with said one surface, a non-rotatable friction braking element for frictionally engaging the other of said surfaces, means connecting said braking means to said braking element operative upon movement of said braking means into braking relation with said one surface to move said braking element into braking relation with said other surface, fluid pressure means for actuating said braking means and braking element, and means connected to said braking means operable by hand to also effect the operation thereof.

38. A brake arrangement for a vehicle truck having a rotatable element to be braked for braking said truck and having a resiliently supported truck frame, said rotatable element having an annular braking surface, non-rotatable friction braking means for frictionally engaging said surface carried by said frame and capable of movement relative to said frame into braking relation with said surface, fluid pressure controlled means carried by said frame and connected to said friction braking means for moving said friction braking means into braking engagement with said surface, means for moving said friction braking means out of engagement with said surface, and means carried by said frame and connected to said friction braking means and operable by hand to move same into braking engagement with said surface independently of said fluid pressure controlled means.

39. A brake arrangement for a vehicle truck having a rotatable element to be braked for braking said truck and having a resiliently supported truck frame, said rotatable element having an annular braking surface, a plurality of non-rotatable friction braking elements carried by said truck frame and adapted to be moved relative to said frame to frictionally engage circumferentially spaced portions of said surface, fluid pressure controlled means for actuating said braking elements, means for equalizing the movement of said braking elements, and means connected to said braking elements operative by hand independently of said fluid pressure controlled means to effect equalized movement of said braking elements into braking engagement with said surface.

40. A brake arrangement for a vehicle truck having two oppositely disposed rotatable elements to be braked for braking said truck and having a resiliently supported truck frame, each of said elements having an annular friction braking surface, a non-rotatable friction braking element for frictionally engaging each of said surfaces and carried by said frame and being capable of movement relative to said frame into braking relation with said surfaces, a fluid pressure controlled cylinder device for actuating each of said braking elements, a hand operated member operatively connected to each of said braking elements for actuating same, and means in the connection between said member and braking elements for equalizing the operation of both of said braking elements.

41. A brake arrangement for a vehicle truck having two, oppositely disposed rotatable elements to be braked for braking said truck and having a resiliently supported truck frame, each of said elements having an annular friction braking surface, a plurality of non-rotatable friction braking elements carried by said truck frame and adapted to be moved relative to said frame for frictionally engaging circumferentially spaced portions of each of said surfaces, a device operative by fluid under pressure for actuating the braking elements for each of said rotatable elements, means for equalizing the movement of the braking elements for each of said rotatable elements, a member connected to the braking elements at each of said rotatable elements operable by hand to effect the operation thereof independently of said fluid pressure device, and means in the connection between said hand operated means and the braking elements for each rotatable element for equalizing the operation by hand of the braking elements for both of said rotatable elements.

42. A brake arrangement for a vehicle truck having a rotatable member to be braked for braking said truck and having a resiliently supported truck frame capable of vertical movement relative to said member, a non-rotatable braking element adapted when in cooperative relation with said rotatable member to be moved into frictional engagement therewith to brake said truck, actuating means operative to move said non-rotatable element into cooperative relation with said rotatable member, means for supporting said non-rotatable element from said frame, and means operative to release said non-rotatable element from said frame for movement by said actuating means.

43. A brake arrangement for a vehicle truck having a rotatable member to be braked for braking said truck and having a resiliently supported truck frame capable of vertical movement relative to said member, a non-rotatable braking element adapted when in cooperative relation with said rotatable member to be moved into frictional engagement therewith for braking said truck, actuating means operative by fluid under pressure to move said braking element into said cooperative relation, and operative upon the relief of fluid under pressure to release said braking element from said rotatable member for movement with said frame, and other means operative upon the operation of said actuating means by fluid under pressure to release said braking element from said truck frame for movement relatively thereto and operative upon the relief of fluid under pressure from said actuating means to connect said braking element to said truck frame for support and movement therewith relative to said rotatable member.

44. A brake arrangement for a vehicle truck having a rotatable member to be braked for braking said truck and having a resilient supported truck frame capable of vertical movement relative to said member, a non-rotatable friction braking means for frictionally engaging said rotatable member to brake said truck, centralizing means cooperative with said rotatable member for moving said braking means relative to said frame into cooperative braking relation therewith, means normally securing said braking means to said truck frame for movement therewith and operative upon operation of said centralizing means to release said braking means for movement relative to said frame into cooperative relation with said rotatable member.

45. A brake arrangement for a vehicle truck having a rotatable member to be braked for braking said truck and having a resiliently supported truck frame capable of vertical movement relative to said member, non-rotatable friction braking means for frictionally engaging said rotatable member to brake said truck, centralizing means cooperative with said rotatable member for moving said braking means relative to said frame into cooperative braking relation therewith, resilient means for supporting said braking means from said truck frame, and means operative upon the operation of said centralizing means to disconnect said braking means from said resilient means for movement relative to said frame into cooperative relation with said rotatable member.

46. A brake arrangement for a vehicle truck having a rotatable structure to be braked for braking said truck and having a resiliently supported truck frame capable of vertical movement relative to said structure, friction braking means for frictionally engaging said structure to brake said truck, centralizing means cooperative with said structure upon operation by fluid under pressure to move said braking means relative to said frame into cooperative braking relation with said structure, means for releasing said braking means for movement relative to said structure upon the release of fluid under pressure from said centralizing means, means operative upon the release of fluid under pressure therefrom for securing said braking means to said truck frame for movement therewith relative to said structure and operative upon the supply of fluid under pressure thereto to release said braking means for movement relative to said frame into cooperative relation with said structure, and means operative to simultaneously supply and release fluid under pressure to and from the last named means and said centralizing means.

47. A brake arrangement for a vehicle truck having a rotatable structure to be braked for braking said truck and having a resiliently supported truck frame capable of vertical movement relative to said structure, a brake lever rockably connected to said frame at one end, friction braking means carried by said lever adjacent the opposite end adapted to frictionally engage said structure for braking said truck, centralizing means associated with said lever and cooperative with said structure to rock said lever relative to said frame for moving said braking means into cooperative braking relation with said structure, a cylinder device associated with said lever operative by fluid under pressure to effect operation of said centralizing means, means for releasing said braking means for movement with said lever relative to said structure upon release of fluid under pressure from said cylinder device, means including a cylinder device associated with said lever operative upon the relief of fluid under pressure for securing said opposite end of said lever and thereby said braking means to said frame for movement therewith relative to said structure and operative by fluid under pressure to release said lever and braking means for movement relative to said frame into cooperative relation with said structure, and means operative to simultaneously supply fluid under pressure to and release fluid under pressure from both of said cylinder devices.

48. A brake arrangement for a vehicle truck having a rotatable structure to be braked for braking said truck and having a resiliently supported truck frame capable of vertical movement relative to said structure, a brake lever rockably connected to said frame at one end, friction braking means carried by said lever adjacent the opposite end adapted to frictionally engage said structure for braking said truck, centralizing means associated with said lever and cooperative with said structure to rock said lever relative to said frame for moving said braking means into cooperative braking relation with said structure, a cylinder device associated with said lever operative by fluid under pressure to effect operation of said centralizing means, means for releasing said braking means for movement with said lever relative to said structure upon release of fluid under pressure from said cylinder device, means including a cylinder device associated with said lever operative upon the relief of fluid under pressure for securing said opposite end of said lever and thereby said braking means to said frame for movement therewith relative to said structure and operative by fluid under pressure to release said lever and braking means for movement relative to said frame into cooperative relation with said structure, a third cylinder device operative by fluid under pressure to move said braking means into frictional braking engagement with said structure, and valve means for controlling the supply of fluid under pressure to the three above mentioned cylinder devices and operative to delay the supply of fluid under pressure to said third cylinder device until after operation of the other two cylinder devices by fluid under pressure.

49. A brake arrangement for a vehicle truck having a wheel and axle assembly and a truck frame resiliently supported from said assembly for vertical movement relative to the assembly, a brake element carried by said assembly and rotatable therewith, a non-rotatable brake element for braking engagement with the rotatable brake element and normally supported by said truck frame, said non-rotatable element being movable vertically with the truck frame relative to the assembly, means operative to effect the frictional engagement of said brake elements with each other, and means operative upon initiating the operation of the first mentioned means for freeing said non-rotatable element of support by the truck frame.

50. A brake arrangement for a vehicle truck having a truck frame and a truck frame supporting wheel and axle assembly and in which the truck frame is movable vertically relative to the assembly, a brake element carried by said assembly and rotatable therewith, a non-rotatable brake element for braking engagement with the rotatable brake element, said non-rotatable brake element being normally supported by the truck frame and being normally movable vertically therewith, and means operative in initiating a brake application for first freeing said non-rotatable brake element of support by the truck frame and centering the non-rotatable brake element with the rotatable brake element and for then effecting the braking engagement of the braking elements with each other.

51. A brake arrangement for a vehicle truck having a truck frame and a truck frame supporting wheel and axle assembly and in which the truck frame is movable vertically relative to the assembly, a brake element carried by said assembly and rotatable therewith, a non-rotatable element for frictional braking engagement with the rotatable brake element, said non-rotatable brake element being normally supported by and movable vertically with the truck frame, means for effecting the frictional braking engagement of the brake elements with each other, and means operative upon the initiation of the operation of the first mentioned means for freeing said non-rotatable brake element of support by the truck frame and for centralizing the non-rotatable brake element with relation to said rotatable brake element.

CLYDE C. FARMER.